United States Patent
Shehi et al.

(10) Patent No.: US 6,263,263 B1
(45) Date of Patent: Jul. 17, 2001

(54) ALTITUDE CORRECTION FOR AIRCRAFT UNDER NON-ISA TEMPERATURE CONDITIONS

(75) Inventors: Christopher John Shehi, Glendale; Kara Maureen Thiede, Phoenix, both of AZ (US)

(73) Assignee: Honeywell International Inc., Mottistown, NJ (US)

( * ) Notice: Subject to any disclaimer, the term of this patent is extended or adjusted under 35 U.S.C. 154(b) by 0 days.

(21) Appl. No.: 09/481,967

(22) Filed: Jan. 12, 2000

(51) Int. Cl.$^7$ .................................................. G05D 1/00
(52) U.S. Cl. .................... 701/3; 701/4; 701/10; 340/601; 340/977
(58) Field of Search ................... 701/4, 10, 26, 701/210; 340/601, 977, 945; 342/28

(56) References Cited

U.S. PATENT DOCUMENTS 5,160,933 * 11/1992 Hager ..................................... 342/174
5,402,116 * 3/1995 Ashley ................................. 340/870.1

OTHER PUBLICATIONS

Federal Aviation Administration Draft Advisory Circular, (AC) 91–XX, Altimeter Errors At Cold Temperatures Dec. 20, 1999.
Page from Jeppesen's Canada Airway Manual, PAJN, Juneau Intl, Juneau, Alaska, LDA–1 Rwy 8, Figure 1, Nov. 6, 1998.

\* cited by examiner

*Primary Examiner*—William A. Cuchlinski, Jr.
*Assistant Examiner*—Arthur D. Donnelly

(57) ABSTRACT

A new and useful apparatus for automatically correcting for the actual altitude of an aircraft, under non-ISA temperature conditions is provided. An apparatus according to the present invention can be particularly useful in automatically providing altitude correction output to a navigation and control system for an aircraft at selected points along an aircraft flight path where terrain clearance under non-ISA temperature conditions is an important operational parameter. An altitude correction device according to the invention is configured to provide altitude correction output with respect to a predetermined landing site as a function of the following formula to compute the aircraft's relation to the computed path relative to the predetermined landing site:

$$Hact = \frac{Tm \cdot std'}{Tm \cdot act'} * Hind$$

Where grad=0.00198 deg/ft $t_o$=Taer+grad*Haer
(Taer being the temperature at the landing site and Haer being the landing site elevation)

Tm.act'=273+$t_{o-0.5*grad*Hind}$
Tm.std'=288–0.5*grad*Hind

Additionally, an altitude correction device according to the present invention is further configured to provide altitude correction output with respect to a predetermined landing site as a function of the following calculation to correct altitude targets:

$$Hind = \frac{Tm \cdot act}{Tm \cdot std} * Hact$$

Where grad=0.00198 deg/ft $t_o$=Taer+grad*Haer
(Taer being the temperature at the landing site and Haer being the landing site elevation)

Tm.act=273+to–0.5*grad*Hact
Tm.std=288–0.5*grad*Hact

| PAJN JUNEAU INTL | ♣JEPPESEN 6 NOV 98 (11-1) | | | JUNEAU, ALASKA LDA-1 Rwy 8 | |
|---|---|---|---|---|---|
| *ATIS 126.4 | ANCHORAGE Center 133.9 | *JUNEAU Tower 118.7 | *Ground 121.9 | JUNEAU Radio (LAA) CTAF 118.7 when Twr inop. | |
| LDA IJDL 109.9 | Final Apch Crs 062° | Minimum Alt BARLO 3400' (3381') | Refer to minimums | Apt Elev 19' TDZE 19' |  |
| MISSED APCH: Immediate climbing RIGHT turn via IJDL LDA SOUTHWEST course to cross BARLO INT/D8.0 IJDL LDA at or above 3000'. Continue climb to 5200' direct to SSR VOR or EEF NDB and hold. | | | | | |
| Alt Set: INCHES 1. Use IJDL DME when on LOC course. 2. For night circling, if runway lights not visible over the MAP, execute missed approach. 3. When DME is not used, continous ADF monitoring of CGL NDB is required to identify the MAP. Any go-around commenced after passing the MAP will not provide standard obstruction clearance. | | | | MSA CGL NDB | |

13 Claims, 5 Drawing Sheets

ALTITUDE CORRECTION FOR AIRCRAFT UNDER NON-ISA TEMPERATURE CONDITIONS

FIELD OF THE INVENTION

The present invention relates to an altitude correction device for an aircraft, and particularly to an altitude correction device configured to be in an altitude correction mode where terrain clearance under non-ISA (International Standard Atmosphere) temperature conditions is an important operational parameter to the aircraft.

BACKGROUND

As an aircraft is approaching an intended landing site, it generally goes into an approach phase in which it seeks to descend along a defined descent path to its landing site. During the approach phase, the altitude of the aircraft is controlled either by its navigation system or by a ground based control system which sends signals to the aircraft to control its altitude. An instrument approach to an airport which relies upon the navigation system for vertical guidance is often referred to as a "non precision" approach, because the navigation system performs calculations to control the altitude of the aircraft, but those calculations are based on sensed barometric pressure which enables the navigation system to approximate, but may not be precise to, the intended descent path of the aircraft. During such a non precision approach, the aircraft descends under the control of the navigation system until the aircraft is at a predetermined distance from its landing site. At that predetermined altitude, the approach depends on the flight crew having sufficient visual contact with the landing site to enable the flight crew to visually land the plane at the landing site.

In contrast, a precision instrument approach to an airport relies upon an instrument landing system (ILS) which continuously transmits information from the landing site to the navigation system during the approach phase and during the landing, to control the altitude of the aircraft relative to the landing site at all times during the approach phase and during the landing, irrespective of whether the flight crew has visual contact with the landing site. An ILS landing does not require the navigation system to calculate the altitude of the aircraft, but under non-ISA temperature conditions it may be useful for the navigation system, or the flight crew, to make a calculation of the actual altitude of the aircraft, to confirm that the aircraft is at the designated altitudes at predetermined points on its descent path to the landing site.

The flight plan entered into the aircraft navigation system indicates the ideal flight path to be flown, both laterally and vertically. Minimum-altitude information, provided by national aviation authorities, has been surveyed and checked to provide ample clearance from terrain and structures. The specific altitude clearance employed varies according to environment and usage. Minimum altitudes during in route operations and over mountains provide wide margins. Minimum altitudes near runways, however, where the aircraft is intentionally maneuvered close to the ground, have very small margins in order to allow the aircraft to maintain a normal descent to the runway.

When these minimum altitudes are entered into the flight plan, then the navigation system can guide the aircraft along the ideal flight path safely above the obstacles. Thus, if the navigation system, and the aircraft's automated guidance system (i.e. the autopilot system) rely upon an altitude input based upon sensed barometric pressure, there is normally enough clearance with the terrain to make up for any inaccuracies due to the actual operating environment of the aircraft.

However, during the approach phase, the if the aircraft is operating under non-ISA temperature conditions, (e.g. if the temperature at the landing site is at or below 0° C.), an altitude calculation based upon the sensed barometric temperature may not be an accurate indication of the actual altitude of the aircraft. Specifically, where landing temperature is significantly below ISA (e.g. 0° C. or less) altitude data based only on barometric pressure would indicate an altitude which is higher than the aircraft's actual altitude, placing the aircraft low in relation to its expected flight path. Hence, as the aircraft descends, the vertical clearances expected by the flight plan may be reduced, possibly without the flight crew's awareness. During a non-precision approach this problem is particularly important, because the navigation system needs to bring the aircraft along a descent path to a point at which the flight crew takes over visually to land the aircraft. If the altitude calculation has a significant variance from the intended altitude, the vertical clearances between the aircraft and the terrain may be eroded to a point where vertical clearances from the terrain present a significant problem. A flight crew can make manual corrections during the approach phase, using tables provided by International Civil Aviation Organization (ICAO) PANS-OPS (Procedures for Air Navigation Services—Aircraft Operations), but such manual corrections require the flight crew to perform mathematical computations quickly during a phase of flight where workload is already quite high. Moreover, the magnitude of the effects of non-ISA temperature on barometric altitude data is not fully understood within the aviation community (e.g. a pilot used to flying in warm weather conditions who is unexpectedly asked to fly a cold weather route would not necessarily understand the magnitude of the effects of non-ISA temperatures on barometric altitude data).

SUMMARY OF THE PRESENT INVENTION

The present invention provides a new and useful device for automatically correcting for the actual altitude of the aircraft, under non-ISA temperature conditions. A device according to the present invention can be particularly useful in automatically providing altitude correction output to a navigation system at selected points along an aircraft flight path where terrain clearance under non-ISA temperature conditions is an important operational parameter to the navigation system.

More specifically, the present invention provides an altitude correction device for an aircraft, which altitude correction device is configured to provide altitude correction output with respect to a predetermined landing site as a function of the following formula to compute the aircraft's relation to the defined vertical flight path relative to the predetermined landing site:

$$Hact = \frac{Tm \cdot std'}{Tm \cdot act'} * Hind$$

Where
  grad=0.00198 deg/ft
  $t_o$=Taer+grad*Haer
    (Taer being the temperature at the landing site and Haer being the landing site elevation)
  Tm.act'=273+$t_o$−0.5*grad*Hind
  Tm.std'=288−0.5*grad*Hind
  Additionally, an altitude correction device according to the present invention is further configured to provide altitude correction output with respect to a predetermined landing site as a function of the following calculation to correct altitude target altitudes at specified points:

$$Hind = \frac{Tm \cdot act}{Tm \cdot std} * Hact$$

Where
grad=0.00198 deg/ft
$t_o$=Taer+grad*Haer
(Taer being the temperature at the landing site and Haer being the landing site elevation)
Tm.act=273+$t_o$−0.5*grad*Hact
Tm.std=288−0.5*grad*Hact Moreover, if the aircraft has an automated guidance device and a barometric sensor from which the automated guidance device can access data related to the altitude of the aircraft, the altitude correction device is configured to provide altitude correction output to the automated guidance device.

The present invention is designed to be particularly effective where the temperature at the landing site is at or below 0° C. However, the principles of the present invention can be applied to provide altitude correction under other non-ISA temperature conditions. Additionally, the present invention is intended normally to be implemented during an aircraft's approach phase during which the aircraft is descending and/or leveling as it descends toward the predetermined landing site, but it is further contemplated that the present invention would be useful during a missed landing approach phase in which the aircraft is maneuvering (including climbing) as a result of a missed landing approach. Indeed, the principles of the present invention can be useful under any non-ISA temperature conditions where compensation to reflect the aircraft's actual altitude is either not in conflict with, or is considered important enough to override, air traffic conditions.

These and other features of the present invention will become further apparent from the following detailed description and the accompanying drawings.

DETAILED DESCRIPTION

As described above, the present invention is particularly useful during the approach phase of an aircraft which is flying a non-precision approach to a landing site, and where altitude correction under non-ISA temperature conditions is an important operating parameter for the aircraft. The principles of the present invention are described below in connection with a simulated arrival into Juneau, Ak., and under simulated conditions where the temperature at the Juneau airport is at or below 0° C. (a non-ISA temperature condition) and where terrain clearance under non-ISA temperature conditions is an important operational parameter to the aircraft navigation system.

Figure 1A:
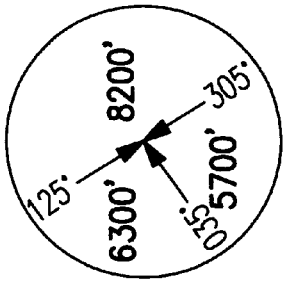
FIG. 1 (FIGS. 1A, 1B, and 1C, collectively) is a terrain map showing selected waypoints in an aircraft flight plan during the approach phase of the aircraft during an arrival into Juneau, Ak.
Figure 1B:
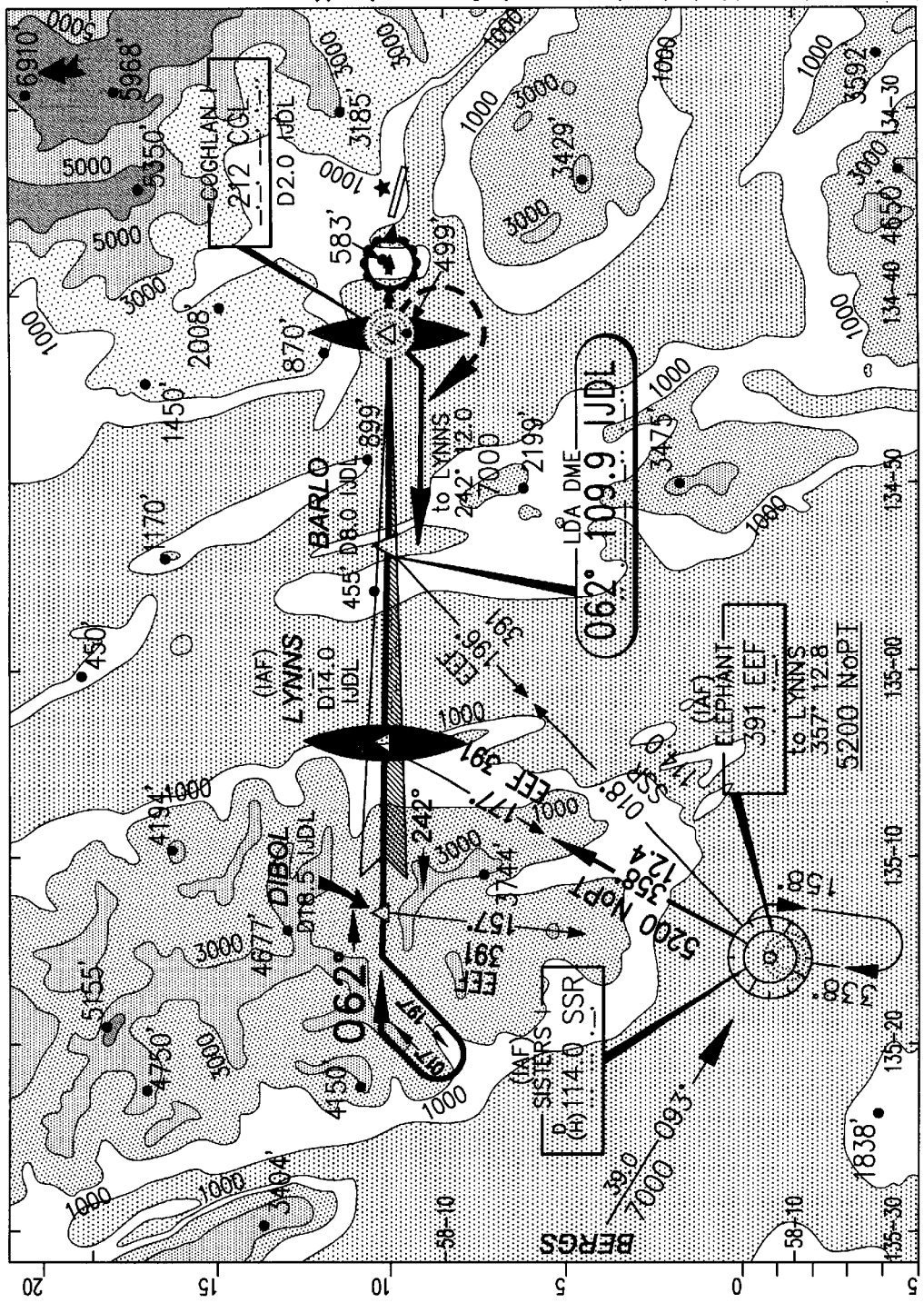
Figure 1C:
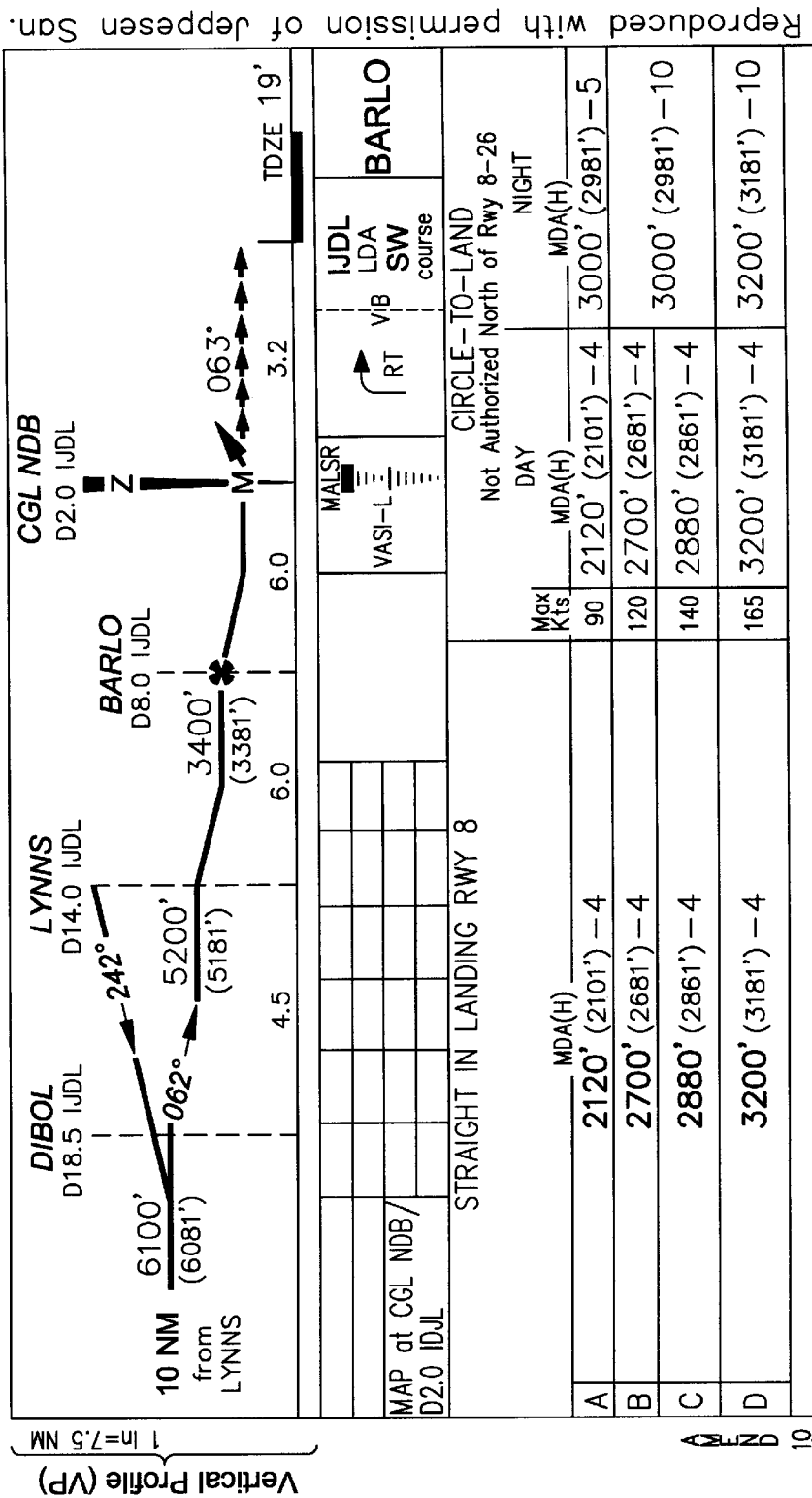

FIG. 1 illustrates the aircraft altitude parameters for a simulated arrival into Juneau, Ak. The flight plan map (FIG. 1) shows the projected flight plan of the aircraft from the waypoint (EEF) by which an aircraft approaching from the south has transitioned into approach mode into Juneau. In the flight plan map, there are indicators of the actual altitudes of the terrain, at various points along the aircraft's descent path.

As illustrated in the vertical profile part VP of FIG. 1, the descent of the aircraft is ideally along a gradual slope into Juneau, and as the aircraft descends, the vertical clearances between the aircraft and the terrain become gradually smaller. When the aircraft is on a non precision approach (e.g. not conducting an ILS approach) its flight path is generally controlled either manually by the flight crew or automatically by its automated guidance system (aka its autopilot), until the aircraft is at an altitude at which the flight crew should have visual contact with the landing site.

During the approach phase, and particularly when the automated guidance system is under navigation computer control, the altitude input to the automated guidance system is a significant descent parameter. If the aircraft is operating under normal temperature conditions, the altitude shown on the altimeter, which is based on a sensed barometric pressure is the altitude which is read by and taken as input to the automated guidance system. However, as explained above, an altitude which is based upon sensed barometric pressure may be generally accurate enough that when combined with the normal clearances provided in the flight plan, the aircraft can descend with sufficient margins of safety until the point at which the flight crew takes over the landing. However, under non-ISA temperature conditions (e.g. when the landing site temperature is at or below 0° C.), the inaccuracies noted above with respect to altitude based only on sensed barometric pressure may be significant enough to warrant automatic correction during the descent phase. In accordance with the present invention, when operational conditions are such that accurate altitude input to the automated guidance system during non-ISA temperature conditions is considered an important operating parameter, an altitude correction device provides a correction output to the navigation system, so that the navigation system has the corrected altitude during the approach phase. The altitude output from the navigation system to the automated guidance system is therefore a corrected altitude, so that the automated guidance system is operating under the corrected altitude during the descent phase of the flight. In the event that operational parameters (e.g. air traffic) require that the aircraft operate under an altitude based only on sensed barometric pressure, even under non-ISA temperature conditions, the corrected altitude can be overridden by an input from the flight crew to the automated guidance system.

Figure 2:
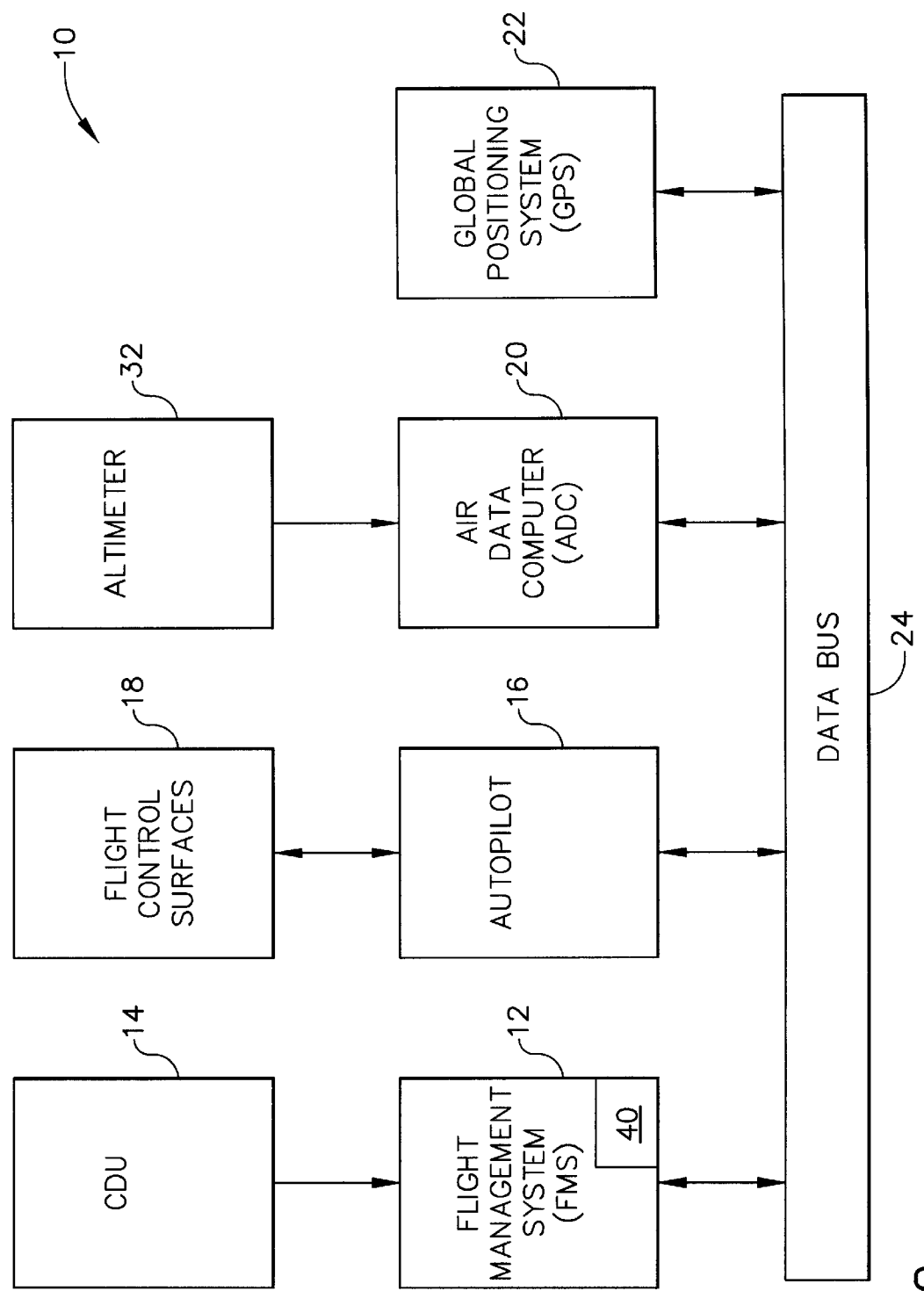
FIG. 2 is a schematic illustration of components of an aircraft navigation and control system which are used in a system according to the present invention.
Figure 3:
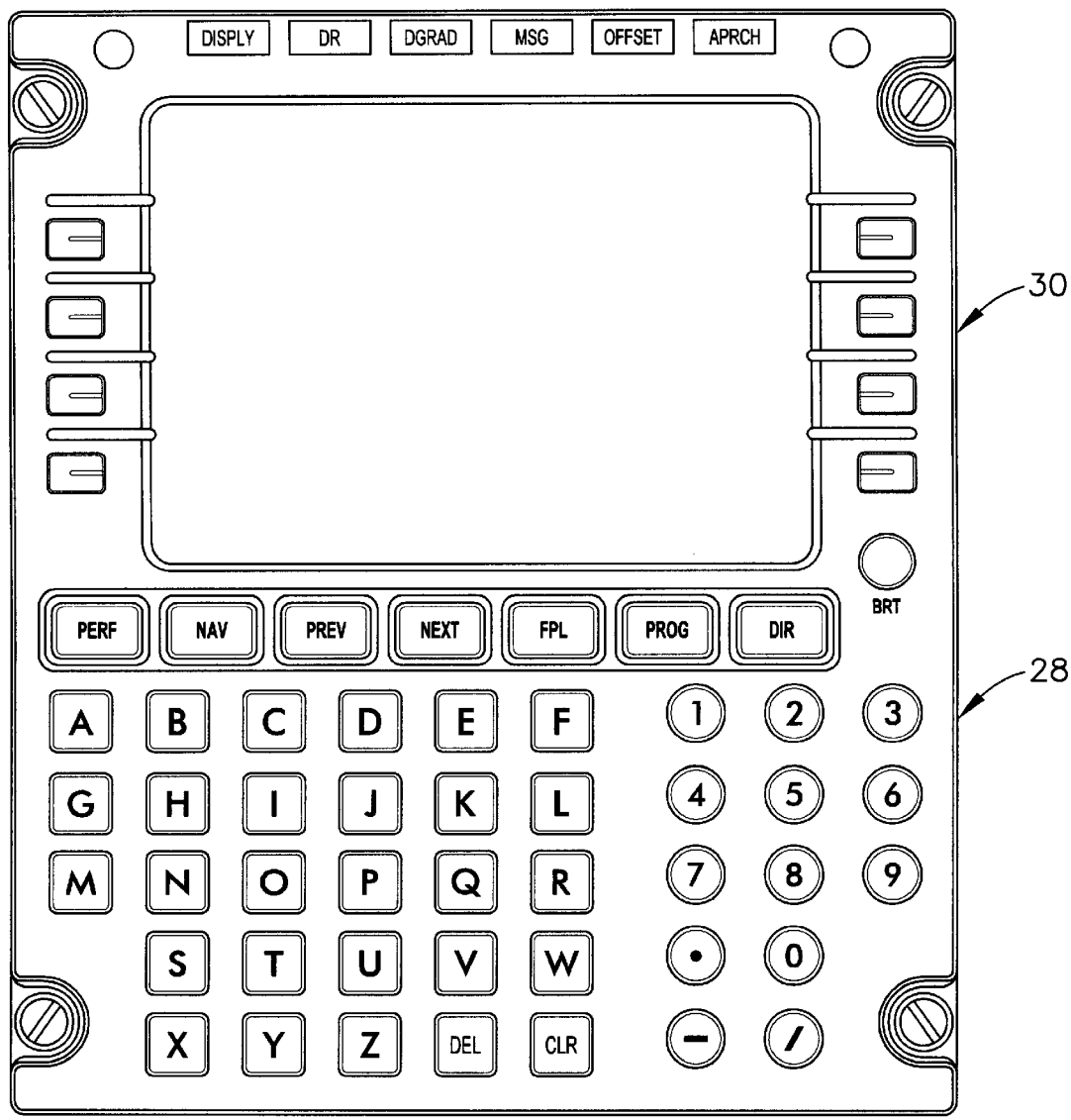
FIG. 3 is a schematic illustration of the face of a Control Display Unit (CDU) component of an aircraft instrument panel at which inputs are used to place the aircraft navigation system in an altitude correction mode, according to the principles of the present invention.

As illustrated in FIGS. 2 and 3, the basic components of an aircraft navigation and control system 10 include a navigation system, also known as the aircraft's Flight Management System, 12 having a control display unit (CDU) 14 at which a flight crew can provide inputs to the Flight Management System 12. The system 10 also includes an autopilot (or automated guidance system) 16 which, when operational, controls the aircraft control surfaces 18 to control the aircraft, an air data computer (ADC) 20 which processes sensor readings (including barometric sensor readings) and a global positioning system (GPS) 22 which processes satellite data that provides precise data of the latitude and longitude of the aircraft. All of the foregoing components can communicate with each other over a data bus 24. Examples of some of the components which can be used to implement the system of FIG. 3 Examples of some of the components which can to used to implement the system of FIG. 3 include a Honeywell model NZ-2000 FMS, a Honeywell model CD-810 CDU, and a Honeywell model ASCB data bus. Such components can be interfaced to the autopilot, ADC and GPS systems of Honeywell or others via the data bus, as will be apparent to those in this art.

During a flight, the flight crew makes flight plan entries and modifications to the flight plan through the CDU 14. The CDU 14 has a keyboard portion 28 and a display portion 30. The flight crew can input or modify the flight plan at the keyboard portion 28, which is input to the flight management system computer. The inputs, e.g. the waypoints and their associated altitudes, for a flight plan, are displayed in text form on the CDU display portion 30. Such inputs, e.g. the waypoints and their associated altitudes, are graphically displayed on a navigational display (not shown) associated with the FMS 12. A barometric pressure sensor provides sensed barometric pressure data to the ADC, and the ADC uses standard temperature and pressure to produce an altitude indicator data (Hind). Such altitude indicator data is typically displayed on the aircraft's altimeter 32, and is available to the FMS over the data bus 24. The autopilot 16, when operational, receives inputs from the Flight Management System 12 as to the flight plan, from the GPS as to the precise latitude and longitude of the aircraft and from the ADC as to the altitude indicator data. The autopilot produces output that communicates with and operates the aircraft controls to fly the aircraft according to the flight plan. The foregoing features of an aircraft control system are well known to those in the art and should not require further explanation.

As an aircraft is approaching its intended landing site, there is generally a selected waypoint in the flight plan at which the navigation system transitions into it's approach phase toward the landing site. For example, in the flight plan map shown in FIG. 1, the waypoint designated (EEF) is the waypoint by which an aircraft, approaching from the south, will see its navigation system transition into approach mode into the Juneau airport. The aircraft should have a gradual descent along a defined descent path into the Juneau area, to the point at which the flight crew will take over control of the aircraft and visually land the plane. As seen from the vertical profile part VP of FIG. 1, the descent path may include some points at which the aircraft will level off, and other points at which the aircraft is descending, but the overall descent is geared toward a gradual descent path into Juneau. When the autopilot 16 is operational, it receives input from the FMS, the ADC and the GPS and uses that input to provide the programmed descent path into the Juneau area.

As described above, under normal temperature conditions, the altitude indicator data (Hind) from the ADC is available to the FMS 12 and that data is computed from the sensed barometric pressure and displayed on the aircraft's altimeter 32. Since all aircraft under the control of a particular air traffic control area would be operating on the same ambient conditions, if there are any discrepancies between actual aircraft altitudes and the data computed by the ADC, the discrepancies should be the same for all aircraft under the control of that air traffic control area.

In accordance with the present invention, when the navigation system enters its approach phase, if ambient temperature, e.g. at the landing site, is significantly below ISA (e.g. if airport temperatures were at or below 0° C.) an altitude correction device 40 provides outputs to the flight management (navigation) system 12 for automatically correcting for the actual altitude of the aircraft. In FIG. 2, the altitude correction device is schematically represented as a portion of the FMS, but it should be noted that the altitude correction device can be a program that runs on the FMS computer and provides the altitude correction output, or it can be a separate device which communicates its altitude correction output to the data bus where it is available to the FMS as well as the other components connected to the data bus. The altitude correction device 40 is particularly useful in automatically providing altitude correction output at selected points along an aircraft flight path where terrain clearance under non-ISA temperature conditions is an important operational parameter to the navigation and control system 10.

The altitude correction device 40 will transition into an attitude correction mode, in which it provides an altitude correction to the aircraft navigation and control system 10 when the following conditions exist:

a. the airport (landing site) temperature is less than a specified temperature (in the example less than 0° C.);

b. the FMS has transitioned into approach mode;

c. the flight crew has responded positively to a CDU prompt (asking the flight crew if it wants the altitude correction device to be in its altitude correction mode);

d. the autopilot is neither in altitude hold nor altitude capture mode.

In the illustrated example, if all of the foregoing conditions exist, the altitude correction device 40 is configured to provide altitude correction output with respect the Juneau landing site as a function of the following formula to compute the aircraft's relation to the computed path relative to the Juneau landing site:

$$Hact = \frac{Tm \cdot std'}{Tm \cdot act'} * Hind$$

Where
grad=0.00198 deg/ft
$t_o$=Taer+grad*Haer
(Taer being the temperature at the landing site and Haer being the landing site elevation)
Tm.act'=273+$t_o$−0.5*grad*Hind
Tm.std'=288−0.5*grad*Hind Additionally, an altitude correction device is further configured to provide altitude correction output with respect to the Juneau landing site as a function of the following calculation to correct altitude targets:

$$Hind = \frac{Tm \cdot act}{Tm \cdot std} * Hact$$

Where
grad=0.00198 deg/ft
$t_o$=Taer+grad*Haer
(Taer being the temperature at the landing site and Haer being the landing site elevation)
Tm.act=273+$t_o$−0.5*grad*Hact
Tm.std=288−0.5*grad*Hact In each of the foregoing calculations, Haer, the landing site elevation would be input to the altitude correction device 40 (e.g. if the altitude correction device is incorporated into the FMS 12, the system would already have the Haer as part of the original flight plan input). Taer, the landing site temperature, could be input by the flight crew in response to information from the landing site, but it is also contemplated that the landing site temperature could be automatically communicated to the altitude correction device. Hind, the indicated altitude data, is available to the altitude correction device from the ADC (over the data bus 24).

If the autopilot 16 is controlling the aircraft during the approach phase, the altitude correction device 40 is configured to provide altitude correction output to the autopilot 16. For example, if the altitude correction device is incorporated into the FMS 12, the altitude correction output is provided to the autopilot 16 over the data bus 24.

When the altitude correction device enters its correction mode, if the aircraft is descending and its altitude is lower than the intended flight path, the Flight Management System 12 will signal the autopilot 16 to cause the aircraft to level off until it is able to regain the path and resume its descent. Additionally, if the aircraft is in an airmass descent and the compensated altitude target is above the aircraft, the Flight Management System 12 will signal the autopilot to command a zero sync flight profile, which will cause the aircraft to level off. Still further, when the altitude correction device is in its correction mode, the device will stay in its correction mode in any vertical navigation mode of the Flight Management System. However, if the flight crew is directed by air traffic control to enter a predetermined leveloff altitude to the autopilot, the altitude correction device will not provide altitude compensation for leveloffs at such preselected altitudes.

Thus, according to the foregoing description the present invention provides an altitude correction device which is useful in providing altitude correction where terrain clearance under non-ISA temperature conditions is an important operational parameter, and is particularly useful during the approach phase of an aircraft. Moreover, the altitude correction device is designed to be particularly effective where the temperature at the landing site is at or below 0° C. However, the principles of the present invention can be applied to provide altitude correction under other non-ISA temperature conditions. Additionally, the present invention is intended normally to be implemented during an aircraft's approach phase during which the aircraft is descending and/or leveling as it descends toward the predetermined landing site, but it is further contemplated that the present invention would be useful during the takeoff, departure and missed approach phases of flight. Indeed, the principles of the present invention can be useful under any non-ISA temperature conditions where compensation to reflect the aircraft's actual altitude is either not in conflict with, or is considered important enough to override air traffic considerations.

What is claimed is:

1. Apparatus comprising an altitude correction device for an aircraft, said altitude correction device being configured with a correction mode in which the altitude correction device provides an altitude correction output to the navigation and control system of the aircraft, and said altitude correction device being configured to be in said correction mode at selected points along said flight path where terrain clearance under non-ISA temperature conditions is an important operational parameter to the navigation and control system for the aircraft.

2. Apparatus as defined in claim 1, wherein said altitude correction device is configured to provide said altitude correction output with respect to a predetermined landing site as a function of the following formula to compute the aircraft's relation to the computed path relative to the predetermined landing site:

$$Hact = \frac{Tm \cdot std'}{Tm \cdot act'} * Hind$$

Where
grad=0.00198 deg/ft
$t_o$=Taer+grad*Haer
(Taer being the temperature at the landing site and Haer being the landing site elevation)
Tm.act'=273+$t_o$−0.5*grad*Hind
Tm.std'=288−0.5*grad*Hind.

3. Apparatus as defined in claim 2, wherein said altitude correction device is further configured to provide said altitude correction output with respect to a predetermined airport as a function of the following calculation to correct target altitudes at specified points:

$$Hind = \frac{Tm \cdot act}{Tm \cdot std} * Hact$$

Where
grad=0.00198 deg/ft
$t_o$=Taer+grad*Haer
(Taer being the temperature at the landing site and Haer being the landing site elevation)
Tm.act=273+$t_o$−0.5*grad*Hact
Tm.std=288−0.5*grad*Hact.

4. Apparatus as defined in claim 3, wherein the aircraft has an automated guidance device and a barometric sensor from which said automated guidance device receives input data related to the altitude of the aircraft, said altitude correction device being configured to provide said altitude correction output to said automated guidance device.

5. Apparatus as defined in claim 3, wherein each temperature is based at least partially on a sensed barometric pressure.

6. Apparatus as defined in claim 1, wherein the aircraft has an automated guidance device and a barometric sensor from which said automated guidance device receives input data related to the altitude of the aircraft, said altitude correction device being configured to provide said altitude correction output to said automated guidance device.

7. Apparatus as defined in any of claims 2–5, wherein $t_o$ is at or below 0° C.

8. Apparatus as defined in any of claims 2–5, wherein $t_o$ is measured at a predetermined landing site for the aircraft.

9. Apparatus as defined in any of claims 2–5, wherein the navigation system for the aircraft has an approach phase during which the aircraft is descending and/or leveling as it descends toward the predetermined landing site, and said altitude correction device is configured to be in said correction mode when said navigation system is in its approach phase.

10. Apparatus as defined in claim 9, wherein the navigation system for the aircraft includes a missed landing approach phase in which the aircraft is maneuvering as a result of a missed landing approach, which maneuvering may include climbing as a result of the missed landing approach, and said altitude correction device is configured to be in said correction mode at selected times during a missed landing phase of the navigation system.

11. Apparatus as defined in claim 10, wherein $t_o$ is at or below 0° C.

12. Apparatus as defined in claim 9, wherein $t_o$ is at or below 0° C.

13. Apparatus as defined in claim 1, wherein said altitude correction output is taken from a group which comprises (i) target altitude(s), (ii) path command(s) and (iii) combinations of the foregoing.

* * * * *